United States Patent

[11] 3,575,025

| [72] | Inventors | Hiroshi Tominaga<br>Tokohama-shi;<br>Masanobu Takamatsu, Yokohama-shi, Japan |
|---|---|---|
| [21] | Appl. No. | 498,981 |
| [22] | Filed | Oct. 20, 1965 |
| [45] | Patented | Apr. 13, 1971 |
| [73] | Assignee | Tokyu Sharyo Seizo Kabushiki Kaisha<br>Yokohama-shi, Kanagawa-Ken, Japan |
| [32] | Priority | Dec. 7, 1964, Jan. 14, 1965, Mar. 2, 1965 |
| [33] | | Japan |
| [31] | | 39/68518, 40/1591 and 40/11601 |

[54] MATERIAL FORMING APPARATUS UTILIZING HYDRAULIC PRESSURE
1 Claim, 23 Drawing Figs.

[52] U.S. Cl.................................................. 72/62, 29/421
[51] Int. Cl....................................................... B21d 26/04
[50] Field of Search............................................. 72/62, 61, 60, 58, 59; 29/421

[56] References Cited
UNITED STATES PATENTS

| 2,732,897 | 1/1956 | Musser.......................... | 72/62 |
| 3,376,723 | 4/1968 | Chelminski.................... | 72/56 |

FOREIGN PATENTS

| 719,291 | 4/1942 | Germany....................... | 72/60 |
| 799,566 | 8/1958 | Great Britain................. | 72/63 |

*Primary Examiner*—Richard J. Herbst
*Attorney*—McGlew and Toren

ABSTRACT: A pressure forming device comprises a liquid pressure chamber which communicates with a mold-forming member having a mold cavity into which an article to be formed is inserted. A plunger is mounted for sliding sealing movement in respect to a wall bounding or communicating with the pressure chamber so that it may be moved rapidly in an impulsive movement to displace liquid of the chamber against the member to be molded in the mold cavity to form it to the configuration of the cavity. Means are provided for regulating the movement of a hammer to strike the plunger member to move it in an impulsive movement, and various means are shown for the construction of a mold cavity member and for the means in holding the member to be molded to permit its selected deformation.

Patented April 13, 1971 3,575,025
3 Sheets-Sheet 1
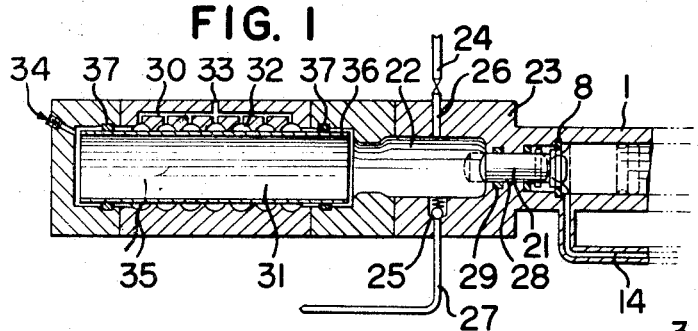
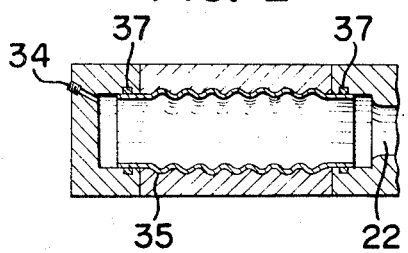
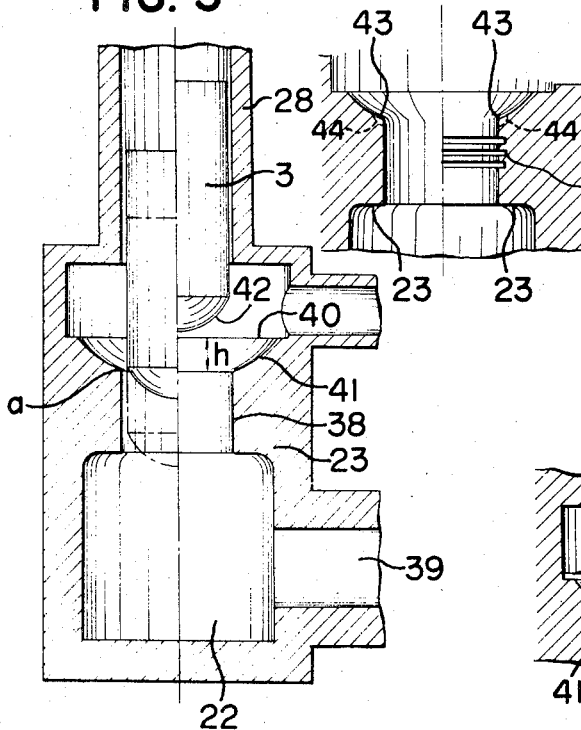
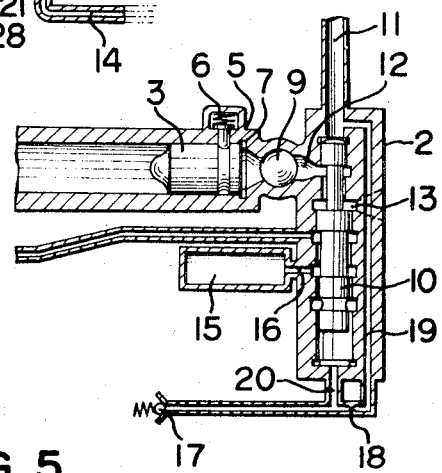
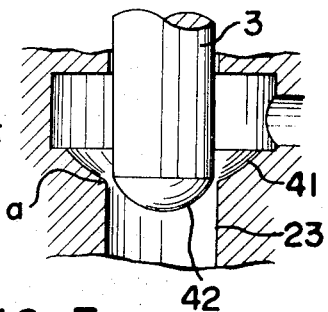
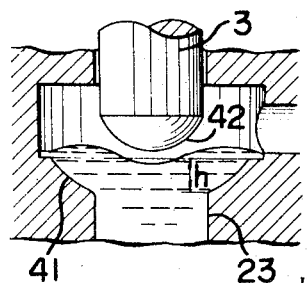
INVENTORS
HIROSHI TOMINAGA
MASANOBU TAKAMATSU
BY McGlew and Toren
ATTORNEYS Patented April 13, 1971
3,575,025
3 Sheets-Sheet 2
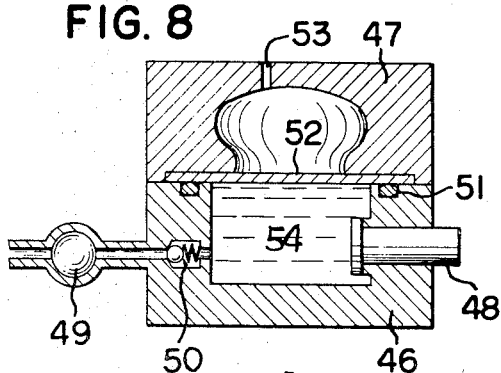
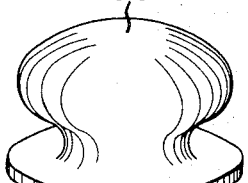
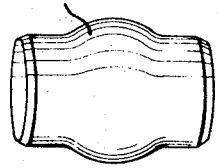
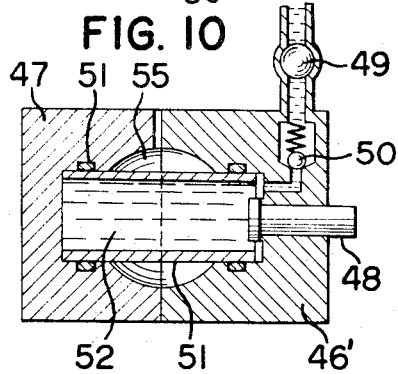
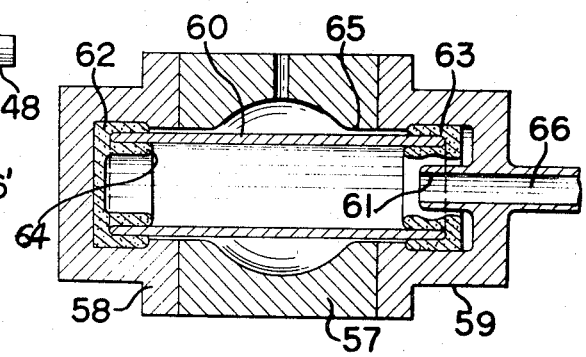
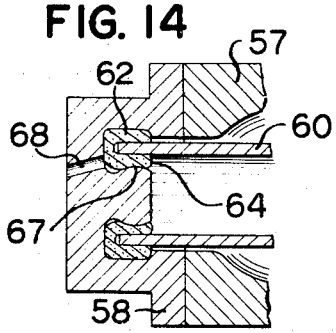
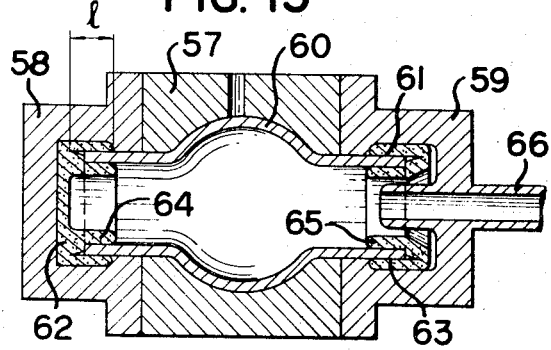
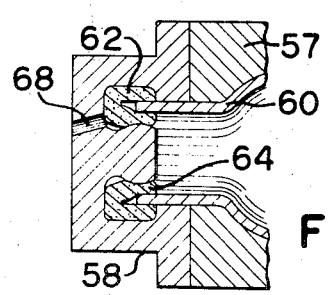
INVENTOR.
HIROSHI TOMINAGA
MASANOBU TAKAMATSU
BY
*McGlew and Toren*
ATTORNEYS Patented April 13, 1971

MATERIAL FORMING APPARATUS UTILIZING HYDRAULIC PRESSURE

SUMMARY OF THE INVENTION

This invention relates to material forming apparatus and more particularly to material forming apparatus utilizing hydraulic pressure generated by impulsive force of an air-operated hammer.

An object of the invention is to provide means for effectively converting impulsive force of an air-operated hammer to hydraulic pressure for working materials.

Other object of the invention is to provide novel sealing means and water passing means of moulds used for hydraulic forming and holding means for split moulds.

Other objects and features of the invention will be apparent in the following description and in the accompanying drawings and in which:

FIG. 1 is a schematic longitudinal section view of an embodiment of the invention;

FIG. 2 shows a part of the embodiment in FIG. 1, wherein forming process of material has been ended;

FIG. 3 is a longitudinal section view of a part of a second embodiment, wherein the left half and the right half show a piston in different operating position respectively;

FIGS. 4 and 5 illustrate a detailed portion in FIG. 3;

FIGS. 6 and 7 show a part of the motive power section of the second embodiment for explaining its operation;

FIG. 8 is a longitudinal section view of the hydraulic pressure developing section and the working section of a third embodiment;

FIG. 9 is a perspective view of the product formed by means of the apparatus shown in FIG. 8;

FIG. 10 is a longitudinal section view of the similar sections to that in FIG. 8 of a fourth embodiment;

FIG. 11 is a perspective view of the product formed by means of the apparatus shown in FIG. 10;

FIG. 12 is a longitudinal section view of the working section of a fifth embodiment, wherein a novel sealing means are used;

FIG. 13 shows the working section in FIG. 11, wherein hydraulic pressure is applied to the sealing means;

FIGS. 14 and 15 show a modified sealing means in different conditions;

Figure 16:
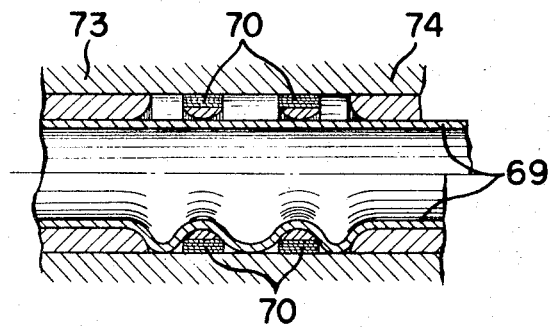
FIG. 16 is a longitudinal section view of a sixth embodiment using a split mould, wherein the upper half illustrates the mould before forming while the lower half illustrates the mould after forming.
Figure 17:
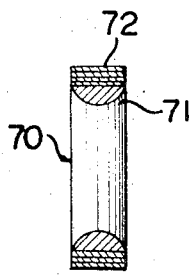
FIG. 17 is a longitudinal section view of an inner mould part of the mould in FIG. 17.
Figure 18:
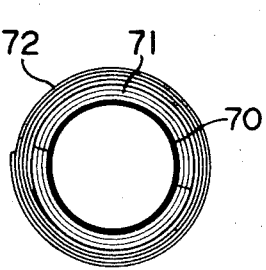
FIG. 18 is a side view thereof.

In FIG. 1, the material forming apparatus according to the invention consists roughly of a motive power section A, a hydraulic pressure developing section B and a working section C.

The motive power section A comprises a relative long cylinder block 1 and a valve casing 2 connected with an end thereof. A reciprocatory hammer 3 within the cylinder block 1 is provided with an annular groove 4 on the periphery thereof. A hammer lock 5 passes loosely through the cylinder wall and is so biased by means of a spring 6 that the inner end of the hammer lock 5 is engageable with the annular groove 4 of the hammer 3 in a position as shown in FIG. 1, that is, in an initial position. The hammer 3, therefore, is locked in this position.

Shock absorbers 7, 8 are provided at both ends of reciprocating stroke of the hammer 3 within the cylinder block 1. In a passage 12 from an end of the cylinder block 1 to the valve casing 2 is provided an automatic stop valve 9 which serves to determine rate of inflow (input) of operating air, as described hereinafter. A reciprocating bobbin-type control valve 10 within the valve casing 2 is used to changeover introduction of compressed air to both ends of the cylinder block 1. The valve casing 2 comprises an inlet of compressed air 11 (communicating to a compressed air source not show), an opening of the passage 12, an exhaust port 13, an air pipe 14 to restore the hammer to the initial operating end of the cylinder block 1, a port 16 communicating to an air tank 15, a passage 19 communicating the inlet of compressed air 11 through a throttle 18 to an operation valve 17, and a passage 20 provided at opposite end to said inlet 11 of the valve casing 1 opening into the passage portion between the throttle 18 and the operation valve 17. In the shown position of the control valve 10, compressed air reserved in the air tank 15 flows through the air pipe 14 into the chamber on the left of the hammer 3 within the cylinder block 1 and restores the hammer 3 to the initial position as shown. The hammer lock 6 engages the annular groove 4 of the hammer 3 thereby locking it at the shown position. When the operation valve 17 is released manually, mechanically or electromagnetically, the air below the control valve 10 within the valve casing 2 escapes through the passage 20, so that the control valve 10 moves downwards. Accordingly pressure of the compressed air is applied through the inlet 11, passage 12 and automatic stop valve 9 to the hammer 3 to accelerate it to the left after causing disengagement of the block pin 7 with the groove 4. Then the hammer 3 runs against a plunger 21 in the hydraulic pressure developing section B.

The hydraulic pressure developing section B comprises a casing 23 constituting a hydraulic chamber 22 into which passages 26 and 27 open through a safety and air-escape valve 24 and an automatic feed valve 25 in the form of a check valve respectively. The passage 26 opens in the atmosphere, while the passage 27 communicates to a water supply. The plunger 21 is inserted water and airtightly in a cylinder portion 28 formed at the casing 23. The hydraulic chamber 22 is so formed as to communicate to a chamber 31 of a mould 30 of the working section C.

The working section C consists of the mould 30 having the chamber 31 the inner surface of which is formed as pattern surface 32 for a material to be worked. At the pattern surface 32 is provided air holes 33 leading to the outside of the mould 30, and further at the end of the mould 30 is provided an air-escape valve 34. Packings 37 are provided on the wall 36 of the chamber 31 in order to maintain watertight between a material 35 to be worked (a hollow cylinder in this case) and the wall 36.

In such construction, when the hydraulic chamber 22 and the chamber 31 are filled with water and thereafter the plunger 21 is struck by the rushing hammer 3, as described above, the impulsive force due to the striking motion is transmitted to the water in the hydraulic chamber 22 and the chamber 31, so that the material 35 is caused to deform by said impulsive force until the peripheral surface thereof comes in contact with the pattern surface 32, as shown in FIG. 2. Thus the working is completed.

Improvements in detailed components of above mentioned apparatus will be described hereinafter.

In a second embodiment shown in FIGS. 3 to 7, 38 indicates a cylinder comprising the hydraulic chamber 22 at the lower portion thereof and the cylinder 28 at the upper portion thereof. The hammer 3 is so housed in the cylinder 28 as to reciprocate in the vertical direction. In this embodiment the hammer 3 serves for the plunger, too and, therefore, can protrude directly into the hydraulic chamber 22. Further a port 39 opens into the hydraulic chamber 22. When air pressure is applied to the hammer 3, the hammer 3 rushes into the cylinder 38 filled with water and compresses impulsively the water within the hydraulic chamber 22. In the right half of FIG. 3 the hammer 3 is shown approaching the entrance of the cylinder 38 and just before touching the water level 40, while the left half shows the hammer 3 in solid lines immediately before reaching the upper edge portion a of the cylinder 38 and the hammer 3 protruding into the cylinder 38 in broken lines.

An entrance wall 41 of the cylinder 38 is shaped like a bowl or other suitable form as shown, and serves to maintain the water level 40 by higher than the upper edge of the cylindrical portion of said cylinder 38. Further the lower end 42 of the hammer 3 is made convex and has, for example, a surface of revolution of a circular arc.

At high speeds the water level 40 will fluctuate under the influence of the wind pressure caused by the moving hammer 3. Since the lower end 42 of the hammer 3 is shaped as described above, the hammer 3 may plunge into the water without disturbing the water level. This condition is shown in FIG. 7. If air (air cells) become mixed with the water due to bubbling or rippling of the water surface, the energy required for stroke of the hammer 3 would be dissipated in the compression of the air cells upon the rising of the water pressure. Thus the special device as described above becomes necessary.

The water in the cylinder 38 gushes out between the peripheral surface of the hammer 3 and the inner wall of the cylinder 38, until the edge of the lower end 42 of the approaching hammer 3 comes into touch with the edge portion a of the cylinder in FIG. 6, and thereafter the hammer 3 compresses impulsively the water within the cylinder 38. The entrance wall 41 of the cylinder 38 and the transition portion of the lower surface 42 of the hammer 3 to the peripheral surface thereof are so formed that the water from the cylinder 38 may gush out preferably in bulk without scattering. That is necessary for making good use of impulsive energy due to the hammer 3 and avoiding mix of air cells. It is preferable to round off the edge portion a at 43 as shown in FIG. 4. As the edge portion a is liable to wear out because of the gushing of the water at high speed, said rounding also serves to increase durability. Further, several slots 44 provided along the circumference of the edge portion a may discharge casually mixed air cells together with water therethrough.

Still more, in order to prevent the water of high pressure from leaking between the surfaces of the cylinder 23 and the hammer 3, it is preferable to provide a labyrinth 45 at the surface of the cylinder portion, as shown in FIG. 5. As the impulsive water pressure occurs in a moment (millisecond in the order of magnitude) owing to high speed of the hammer 3, it is the labyrinth 45 is very desirable to prevent leakage. Introduction of air into the cylinder 23 is avoided by careful selection of the dimensional height to provide synchronization of water flow with the hammer movement.

In order to prevent the air from mixing with the water, it is usual to provide a separate metal or nonmetal piston such as a rubber diaphragm or the like on the boundary surface between the air and the water (water surface 40), however, it is advantageous that the hammer 3 is arranged to move so that a part of the impulsive energy of the hammer 3 is lost before contacting the piston (diaphragm).

The construction should be such that it is possible to transmit effectively the impulsive energy from the hammer 3 directly to the water and to prevent the air cells from mixing with the water to thereby generate the impulsive water pressure at high efficiency.

In FIGS. 8 and 9 illustrating a third embodiment, an apparatus body is indicated with 46 and 46' respectively a mould with 47, a plunger with 48, a pump with 49, a nonreturn valve with 50, a packing with 51, a material to be worked with 52, and an air passage with 53 respectively. The interior of the body 46 is filled with water. The plunger 48 passes through the sidewall of the body 46 and can be rapidly moved to generate an impulsive hydraulic pressure on the fluid in chamber 54 as in the motive power section A of FIG. 1. The pump 49 communicates through the nonreturn valve 50 to the interior of said body 46. In this embodiment, the water 54 within the apparatus body 46 is given pressure by reciprocating the plunger 48. A liquid other than the water may be connected to be fed through the pump 49 and the nonreturn valve 50 to the apparatus body 46. A gear pump or a plunger pump of usual type can be used as the pump 49. The pump 49 may be omitted when city water of suitable pressure is available.

The material 52 to be worked, for example a steel disc, is placed over the packing 51 on the apparatus body 46. The mould 47 having the air passage 53 is placed over the disc, as shown in FIG. 8

On FIG. 10 the inner surface of the mould 47 is formed with an annular space 55 between the inner surface of the mold and the material 52. The space 55 communicates through the air passage 53 to the outside. The packing 51 disposed between the apparatus body 46 and the mould 47 serves to prevent the water of high pressure from leaking.

In a fourth embodiment shown in FIGS. 10 and 11, the apparatus body 56 also serves as a part of the mould, however the general construction and operation of the apparatus are similar to that of the third embodiment. In this case arrangement of the apparatus body 46 and the mould 47 can be selected in accordance with the shape to be worked. For easy taking out of the worked article 56 shown in FIGS. 9 or 11 from the mould 47, it is preferable to make the mould 47 separable.

Operation of the hydraulic pressure developing section in FIG. 8 will be explained hereinafter. Water from the exterior is pumped up by the pump 49 and delivered through the nonreturn valve 50 to the interior of the apparatus body 46. After the material to be worked 52 is placed over the packing 51 on the apparatus body 46, the mould 47 is set and secured to the body 46 by suitable fastening means. The water 54 having a relatively low pressure from the outlet of the pump 49 fills the space below the material to be worked 52. The plunger 48 is forced outwardly under the pressure of the water to take a position as shown. Since the space 55 above the material 52 communicates through the air passage 53 to the exterior, an atmospheric pressure exists within the space 55.

Hereupon, when the plunger 48 has been struck, for example, by air punch from the exterior, it transmits the impulsive force to the water 54, so that the hydraulic pressure increases in a moment. Therefore the increased hydraulic pressure acts on the under surface of the material 52 to deform it to the shape given by the inner surface of the mould 47. The hydraulic pressure from the plunger 48 does not reach the pump 49 on account of the nonreturn valve 50. Further, since the compressibility of the water is very low, the volume generally equal to that of the plunger 48 forced in by striking serves to deform the material 52. In case the space 55 is relatively small, the forming operation can be accomplished in a brief time. The pump 49 after the first forming operation, therefore the plunger 48 returns to the initial position after each stroke. Owing to the air passage 53 communicating to the outside the material 52 on the side of the space 55 is not subject to so high back pressure.

In the embodiment shown in FIGS. 12 to 15, the mould is indicated 57, a blind side cover 58, an opening side cover 59, the material to be worked with 60, a hollow projection of the cover 59 with 61, and sealing elements with 62 and 63. On both sides of the mould 57 are arranged the covers 58 and 59, in which the sealing elements 62 and 63 are disposed respectively, as shown in FIG. 12. The hollow projection 61 of the side cover 59 communicates with a connecting pipe 66 for the impulsive hydraulic pressure generating device (not shown) extending outwardly from the cover 59.

Now, when high pressure water having several hundred or several thousand gauge pressure has been generated in a moment, for example, for 0.2 millisecond by the impulsive hydraulic pressure generating device, it acts on the inside of the material 60 and deforms it as shown in FIG. 13. The sealing elements 62, 63 serve to prevent the high pressure water within the material 60 from leaking to the outside thereof at an atmospheric pressure. Since the hydraulic pressure used for this apparatus is very high and length of the material 60 between said sealing elements 62 and 63 decreases with deforming, the sealing elements of special structure are necessary for maintaining close contact of the sealing elements with the material and the desired hydraulic pressure.

For those purpose, the sealing elements 62, 63 in engagement with the respective ends of the material 60 are made of a resilient material such as had rubber, the depth $l$ of fit-in slots for the ends of the material 60 of the sealing elements 62, 63 being made sufficiently long with regard to contraction thereof at working, and lips 64, 65 are formed at the water side of the sealing elements 62, 63 so as to touch closely the material 60 under action of the water pressure. The structure shown in FIGS. 14 and 15 is similar to that of the embodiment in FIGS. 12 and 13, but a projection 67 is formed at the blind cover 58 so as to give a prestress to the lip 64 of the sealing element 62, and an air-escape hole 68 is provided so as to connect the gap between the sealing element 62 and the cover 58 to the outside.

The operation according to the embodiment of FIGS. 12 to 15 is as follows: First both ends of the material to be worked 60 are put in respective fit-in portions of the sealing elements 62 and 63. Then the mould 57 dividable in two or three, the blind cover 58 and the holed cover 59 are assembled and thereafter the connecting pipe of the holed cover 59 is connected with the impulsive hydraulic pressure generating device. When water of a high pressure has been supplied impulsively from said hydraulic pressure generating device through the hollow projection 61 to the inner space of the material 60, the material 60 is worked to take the shape determined by the pattern of the inner surface of the mould 57, as shown in FIG. 13. At that time the lips 64, 65 of the sealing elements 62, 63, owing to the hydraulic pressure, touch intimately the material 60 to maintain watertightness. The higher the hydraulic pressure, the more closely the lips 64, 65 engage the material 60, so that reliable sealing under high pressure is attainable in spite of contracting in length of the material 60. Further, owing to the hollow projection 61 extending into the sealing element 63, it is avoided that dynamic pressure generated by the water rushing into the mould 57 acts directly on the rear side of the sealing element 63 thereby diminishing sealing effect. The apparatus shown in FIGS. 14 and 15 is suitable for higher hydraulic pressure, while the apparatus in FIGS. 12 and 13 is available for lower pressure.

Finally, in the embodiment shown in FIGS. 16 to 23, the material 69 to be worked is in the form of a pipe. A high hydraulic pressure acts on the inner side of the material 69 and swells it in accordance with the mould 70. The mould 70 consists generally of one or more elastic band plates 72 made of spring steel wound thereon. The inner parts 73, 77 are dividable in two or more and detachable after working. Guide members 73 in one piece, if necessary, are put in both ends of the mould 70 prior to working and removed after working. When a casing 74 is put on the mould 70 as shown in FIG. 16, clamps for preventing the band plates 72 from coming loose are not necessary, because the outsides of the band plates 72 are held by the casing 74. The apparatus of FIG. 19 differs from that of FIG. 16 in that the outer end of the band plate 72 is clamped by means of a screw in stead of placing casing 74 on the mold 70 as shown FIGS. 20 and 21. Of course, other clamping member may be used.

The working by means of the mould 70 in FIG. 16 is as follows:

The material to be worked 69 is inserted through the guide members 73 and, after the divided inner part 71 is put on the material 69 at a predetermined position between the guide members 73, the elastic band plate 72 is wound on the inner part 71. In this case, it is necessary to fasten the band plate 72 tightly so as to avoid relative displacement of said band plate 72 to the inner part 71. If the casing 74 is made in two parts, its mounting may be remarkably simplified. Thereafter the inner space of the material 69 is filled with water. When the pressure of the water is increased impulsively, and the water swells the material rapidly against the pattern surface constituted by the mould 70 and the guide members 73 thereby deforming it plastically. After completion of working, the casing 74 is moved away and the band plate 72 of the mould 70 is detached from the inner part 71, and the produced goods (worked material) may be taken out.

Figure 19:
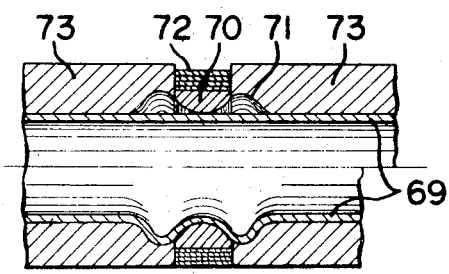
FIG. 19 is a longitudinal section view of a seventh embodiment, wherein the upper half illustrates the mould before forming while the lower half illustrates that after forming.
Figure 22:
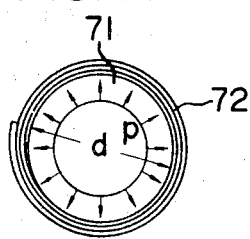
FIGS. 22 and 23 show again the inner mould part in order to explain effect of hydraulic pressure thereupon.
Figure 20:
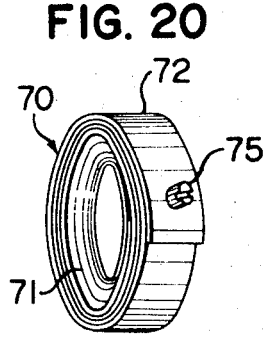
FIG. 20 is a perspective view of an inner mould part of the mould shown in FIG. 19.
Figure 21:
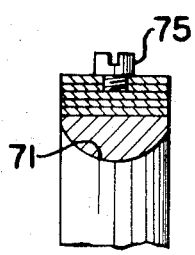
FIG. 21 is a longitudinal section view of a portion of said inner mould part.

The working operation by means of the mould 70 in FIG. 19 is similar to that of FIG. 16 with the exception that the band plate 72 wound on the inner part 71 is clamped by a screw 75 instead of the casing 74.

Next, the operation of this embodiment will be theoretically analyzed.

Figure 23:
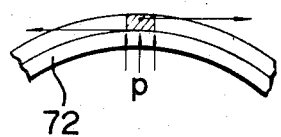

Since the band plate 72 is wound tightly on the inner part 71, a frictional force acts on each contact surface of the inner layers of the band plate 72 with the outer layers thereon as well as on the contact surface of the innermost layer with the inner part 71. Provided that the inner part 71 is applied with a hydraulic pressure in the outward direction at the working operation, the resultant force between the force having a tendency to loose the wound band plate 72 (tension) and the frictional force acting in the opposite direction due to the hydraulic pressure acts on the contact places of the band plate 72, as shown in FIG. 23. This resultant force decreases from the interior towards the exterior of the band plate 72 by an amount corresponding to the frictional force and finally reaches zero at several turns. Tension thus does not act on the outer band having more than said several turns. Such clamping member having structure as shown in FIGS. 16 or 19 is sufficient to prevent the outer band plate from loosening.

The frictional force mentioned above is equal to ($\mu p$ X contact surface), wherein $\mu$ is coefficient of friction of the band plate 72 and $P$ is a pressure acting on unit surface. Tension applied to the innermost band plate 72 is given by $pd/2$, wherein $d$ is the inner diameter of the band plate 72. The pressure $p$ decreases with increase in turns of said band plate. Supposing that the pressure is constant, the band plate does not loose, when the following condition exists;

$$n\mu p \frac{ld}{4} \geqq \frac{pd}{2}$$

(frictional force)   (tension)

$$\therefore n \geqq \frac{2}{\mu t}$$

in which n is number of turns of the band plate 72. Accordingly, if $\mu=0.2$, 3.2 turns of the band plate will suffice to become loose.

Thus, the divided part 71 of the mould 70 may be easily fastened under a high hydraulic pressure, since the tension upon the band plate 72 decreases outwardly owing to its own frictional force and finally reaches zero at several the number of turns regardless of turns thereof. Further, the thickness $t$ of the bank plate 52 may preferably be selected according to the equation $2\mu t = pd$ at an allowable stress $\delta$.

We claim:

1. Material forming apparatus utilizing impulsive hydraulic pressure, comprising means defining a motive power section including a cylinder, a hammer movable in said cylinder, a changeover mechanism connected to said cylinder for supplying impulsive compressed air charges to said cylinder for rapidly moving said hammer, a hydraulic pressure developing section having a hydraulic chamber in which an impulsive hydraulic pressure is to be generated connected to said motive power section, a plunger having a portion extending into said motive power section and a portion extending into said hydraulic pressure developing section, said hammer being impulsively movable in said motive power section in response to a supply of compressed air to move against said plunger to displace it further into said hydraulic pressure section for generating an impulsive hydraulic pressure therein, and a working section communicating with said hydraulic pressure developing section and constituting a mold for a material to be worked, said changeover mechanism for controlling the supply of compressed air including a valve casing, a bobbin-type control valve reciprocal within said valve casing, and an operation valve for actuating said control valve, and an automatic stop valve for determining the air flow into said motive power section.